United States Patent
Song

(10) Patent No.: US 7,903,649 B2
(45) Date of Patent: Mar. 8, 2011

(54) MOBILE IPV6 NETWORK SYSTEM AND METHOD FOR FORWARDING PACKET IN THE SYSTEM

(75) Inventor: Ji-Soo Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 702 days.

(21) Appl. No.: 12/002,765

(22) Filed: Dec. 19, 2007

(65) Prior Publication Data

US 2008/0159282 A1 Jul. 3, 2008

(30) Foreign Application Priority Data

Jan. 2, 2007 (KR) .................. 10-2007-0000147

(51) Int. Cl.
*H04L 12/28* (2006.01)
(52) U.S. Cl. ........................ 370/389; 370/392
(58) Field of Classification Search ................ None
See application file for complete search history.

(56) References Cited

U.S. PATENT DOCUMENTS

| | | | |
|---|---|---|---|
| 2004/0105420 A1* | 6/2004 | Takeda et al. | 370/349 |
| 2004/0179536 A1* | 9/2004 | Thubert et al. | 370/395.52 |
| 2004/0213181 A1* | 10/2004 | Grech et al. | 370/331 |
| 2005/0265380 A1* | 12/2005 | Takahashi et al. | 370/464 |
| 2006/0129630 A1* | 6/2006 | Catalina-Gallego et al. | 709/203 |

* cited by examiner

*Primary Examiner* — Chirag G Shah
*Assistant Examiner* — Otis L Thompson, Jr.
(74) *Attorney, Agent, or Firm* — H.C. Park & Associates, PLC

(57) ABSTRACT

A home agent in a mobile Internet Protocol version 6 (IPv6) network system. The home agent is constructed with a home address table including home addresses of a plurality of mobile nodes and binding cache entry indexes corresponding to the home addresses, a next-hop entry table including a plurality of next hop entries mapped to care-of addresses of the mobile nodes, a binding cache entry table comprising a plurality of binding cache entries mapped to the binding cache entry indexes, and a packet processor. When a source address of a packet received by the home agent is included in the home address table in a state where forwarding direction information included in the packet received by the home agent differs from set forwarding direction information, the packet processor encapsulates and forwards the packet received by the home agent using a binding cache entry that is mapped to a binding cache entry index corresponding to the source address included in the home address table.

13 Claims, 6 Drawing Sheets

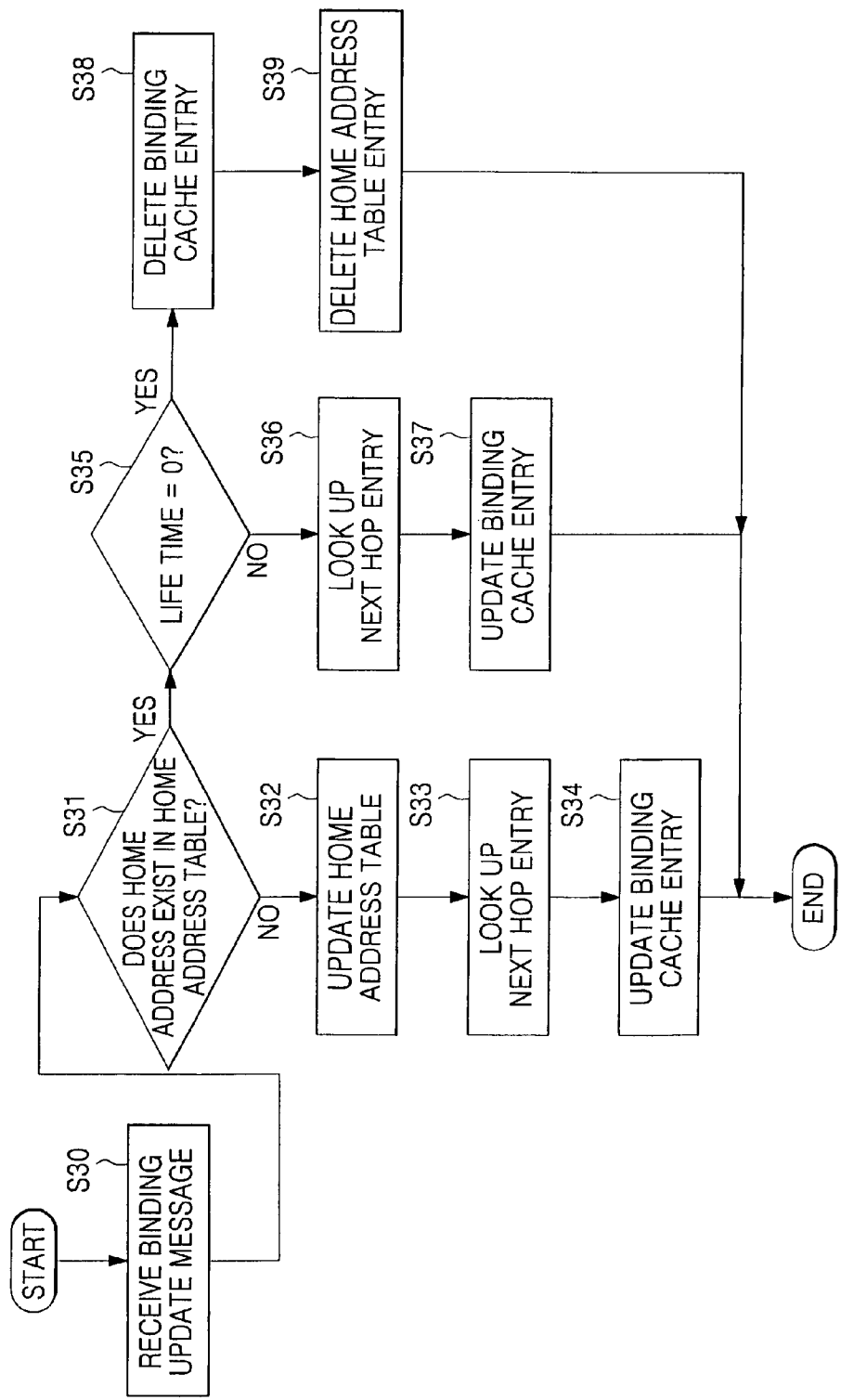

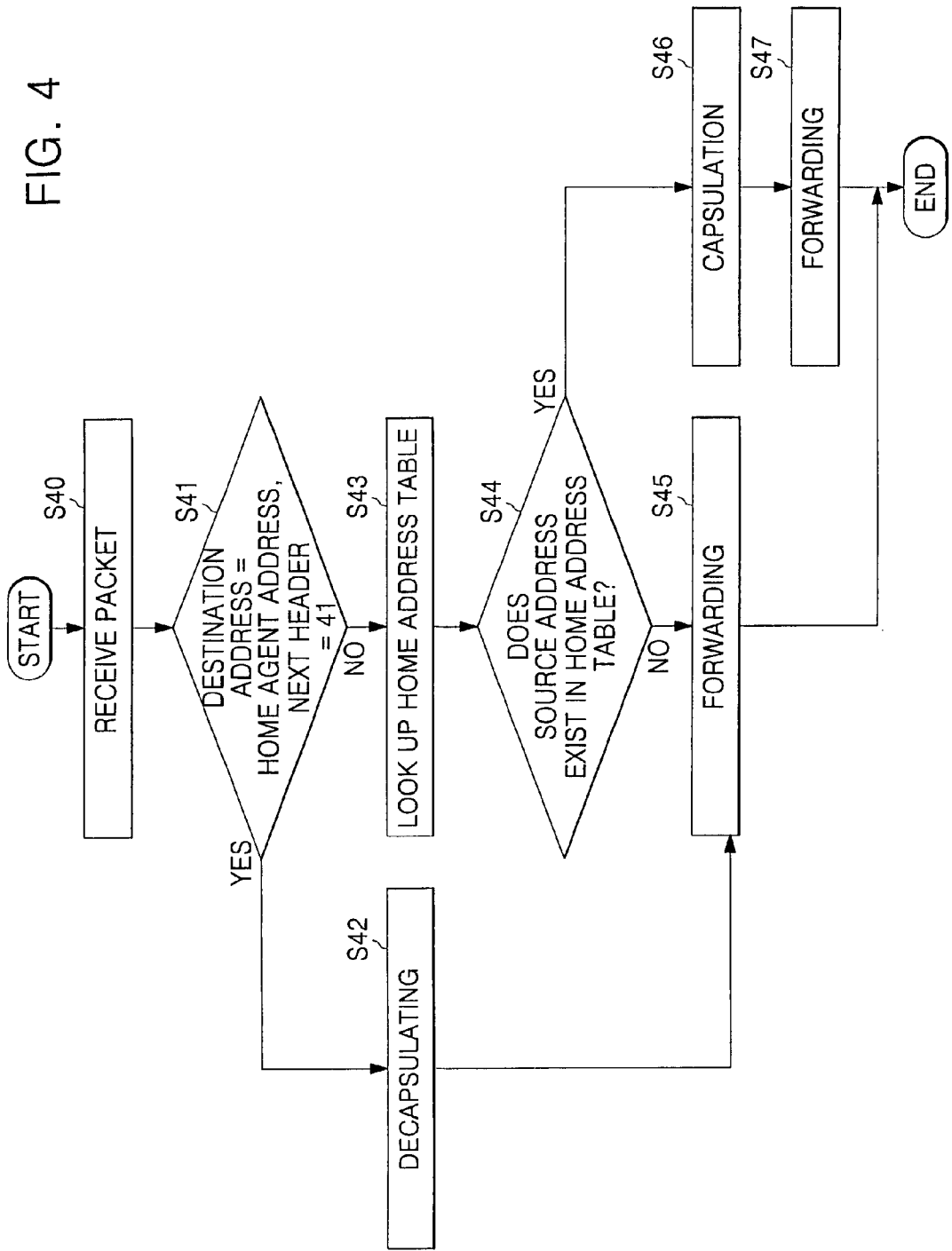

MOBILE IPV6 NETWORK SYSTEM AND METHOD FOR FORWARDING PACKET IN THE SYSTEM

CLAIM OF PRIORITY

This application makes reference to, incorporates the same herein, and claims all benefits accruing under 35 U.S.C. §119 from an application for MOBILE IPv6 NETWORK SYSTEM AND METHOD FOR FORWARDING PACKET IN THE SYSTEM earlier filed in the Korean Intellectual Property Office on 2 Jan. 2007 and there duly assigned Serial No. 10-2007-0000147.

BACKGROUND OF THE INVENTION

1. Field of the Invention

The present invention relates to a mobile Internet Protocol version 6 (IPv6) network system and a method for forwarding a packet in the system.

2. Description of the Related Art

Mobile Internet Protocol (IP) allows a mobile node to be in seamless communication while moving by using two IP addresses, i.e., a unique IP address assigned to the mobile node and a new address assigned on a link to which the mobile node has moved.

An Internet Protocol version 4 (IPv4) mobile IP is limited in an address space, because the Internet Protocol version 4 (IPv4) uses an IPv4 address space system, and has a problem of triangular routing or a shortcoming of requiring a foreign agent.

Meanwhile, an Internet Protocol version 6 (IPv6) mobile IP is based upon Internet Protocol version 6 (IPv6) protocol and does not require a foreign agent because a new address is created on a link to which a mobile node has moved. Accordingly, a terminal with mobility is allowed to use mobile Internet Protocol version 6 (IPv6) irrespective of support of the link. The Internet Protocol version 6 (IPv6) mobile IP supports path optimization to minimize a path delay.

A contemporary mobile Internet Protocol version 6 (IPv6) network system will now be explained. The mobile Internet Protocol version 6 (IPv6) network system is constructed with a home link and a foreign link. A mobile node is located on the home link and operates as a general Internet Protocol version 6 (IPv6) node. The mobile node may transmit a packet to a correspondent node through a general IP routing method in which a home address is used. The mobile node 100 can move from one link to another link, and continues to connect with other nodes using the home address. Here, the home address is a permanent address assigned to the mobile node on the home link. A home agent is a router located on the home link for registering a current position of the mobile node which has moved to a foreign link.

The mobile node may transmit a packet to the correspondent node after moving from the home link to another position (e.g., a foreign link). Here, mobile Internet Protocol version 6 (IPv6) is a protocol applied when a mobile node moves to a foreign link. After moving to the foreign link, the mobile node is allocated a prefix by a router on the foreign link and obtains a care-of address. The mobile node transmits a binding update message including the care-of address information to the home agent. Here, the binding is information for connecting the home address of the mobile node with the care-of address for a life time. Using the binding information, the correspondent node can continue to communicate with the mobile node using the home address even when the mobile node has moved. The mobile node needs to update the binding information when the mobile node obtains a new care-of address or desires to maintain the binding information beyond the life time. Upon receipt of the binding update message from the mobile node, the home agent transmits a binding response message to the mobile node. Thus, the binding is established.

The home agent then tunnels a packet transmitted from the correspondent node to the home address of the mobile node using the care-of address of the mobile node to transmit the packet to a current position of the mobile node. Meanwhile, the home agent decapsulates an IP header from the packet transmitted from the mobile node to the correspondent node and transmits the resultant packet to the correspondent node. By doing so, the mobile node can continue to communicate with the correspondent node.

In addition to the communication method, the mobile Internet Protocol version 6 (IPv6) may allow for direct communication with a correspondent node by supporting path optimization. That is, when a mobile node receives a packet from a correspondent node through tunneling, the mobile node transmits a binding update message having an address of the correspondent node as a destination. Upon receipt of the binding update message from the mobile node, the correspondent node transmits a binding response message. Thus, the binding is established between the mobile node and the correspondent node. This allows the mobile node and the correspondent node to directly communicate with each other, not via a home agent.

In the home agent, a network processor ("packet processor") forwards a packet transmitted and received between the mobile node and the correspondent node. The home agent is also constructed with a next-hop entry table and a binding cache entry table.

After receiving a packet, the packet processor first checks a destination address and a next header included in the received packet to determine a forwarding direction of the packet. In other words, when a destination address for the received packet is an address of the home agent and information included in the next header is "41", the packet processor determines that the packet received from the mobile node is a tunneling packet to be transmitted to the correspondent node. Consequently, the packet processor removes a tunnel header from the tunneling packet received from the mobile node and uses routing information (e.g., a source address) included in the packet without the tunnel header to look up output port (Outport) information and next hop information in the next-hop entry table. The packet processor forwards the packet without the tunnel header to the correspondent node, based upon the output port information and the next hop information looked up in the next-hop entry table.

On the other hand, when the destination address included in the received packet is not the home agent address or the information included in the next header is not "41", the packet processor looks up to see whether the destination address included in the received packet is included in the binding cache entry table.

When the source address included in the received packet exists in the binding cache entry table, the packet processor encapsulates the received packet using a binding cache entry corresponding to the source address of the binding cache entry table. In this case, the binding cache entry includes a destination address corresponding to the source address and a life time. Preferably, the source address is a home agent address, and the destination address is a care-of address of the mobile node.

After encapsulating the received packet using the binding cache entry information, the packet processor looks up the output port (Outport) information and next hop information in the next-hop entry table using routing information (e.g., the source address) included in the received packet. The packet processor forwards the encapsulated packet to the mobile node, based upon the output port information and the next hop information looked up in the next-hop entry table.

Meanwhile, when the destination address included in the received packet does not exist in the binding cache entry table, the packet processor looks up the output port (Outport) information and the next hop information in the next-hop entry table using the routing information (e.g., the source address) included in the received packet. The packet processor forwards the received packet to a receiving side, based upon the output port information and the next hop information looked up in the next-hop entry table. Thus, the packet in this case is not a packet transmitted and received between the mobile node and the correspondent node.

As described above, the packet processor looks up the binding cache entry table even when a packet is transmitted from the correspondent node to the mobile node and when a packet is not transmitted between the correspondent node and the mobile node.

This causes packet forwarding delay from the correspondent node to the mobile node.

SUMMARY OF THE INVENTION

It is therefore an object of the present invention to provide an improved mobile network system and an improved method for forwarding packet in the mobile network system.

It is another object of the present invention to provide a mobile Internet Protocol version 6 (IPv6) network system and a method for forwarding a packet in the system which are capable of preventing packet forwarding delay caused by looking up a binding cache entry for all received packets to determine whether each packet is an Internet Protocol version 6 (IPv6) packet transmitted and received between a mobile node and a correspondent node.

A first aspect of the present invention provides a home agent in a mobile Internet Protocol version 6 (IPv6) network system. The home agent is constructed with a home address table including home addresses of a plurality of mobile nodes and binding cache entry indexes corresponding to the home addresses, a next-hop entry table including a plurality of next hop entries mapped to care-of addresses of the mobile nodes, a binding cache entry table comprising a plurality of binding cache entries mapped to the binding cache entry indexes, and a packet processor. Each next hop entry includes an address of a next node to which a packet received from the mobile node is to be transmitted, and port information of a home agent by which the packet received from the mobile node is forwarded to the next node. Each binding cache entry includes a home address of the mobile node, a life time of a care-of address of the mobile node, an output port of the home agent used for transmitting the packet from the mobile node to a correspondent node, and an address of a node next to the home agent to which the packet directed to the correspondent node is transmitted from the mobile node. When a source address of a packet received by the home agent is included in the home address table in a state where forwarding direction information included in the packet received by the home agent differs from set forwarding direction information, the packet processor encapsulates and forwards the packet received by the home agent using a binding cache entry that is mapped to a binding cache entry index corresponding to the source address included in the home address table.

When the source address of the packet received by the home agent is not included in the home address table in a state where the forwarding direction information included in the packet received by the home agent differs from the set forwarding direction information, the packet processor may look up the next-hop entry table using the address information included in the packet and forward the packet using the looked-up next hop entry.

When the forwarding direction information included in the packet received by the home agent is the same as the set forwarding direction information, the packet processor may remove a tunnel header from a packet having the same forwarding information and forward the resultant packet.

When a home address included in a binding update message received from any mobile node is not included in the home address table, the packet processor may assign a binding cache entry index corresponding to the home address and store the home address and the assigned binding cache entry index in the home address table, store the assigned binding cache entry index in the binding cache entry table, look up a next hop entry corresponding to a care-of address of the mobile node in the next-hop entry table, and store the looked up next hop entry in the binding cache entry corresponding to the assigned binding cache entry index.

When the home address included in the binding update message received from any mobile node is included in the home address table, the packet processor may control update of a binding cache entry mapped to a binding cache entry index that corresponds to the home address included in the home address table, based upon a life time of the binding cache entry.

A second aspect of the present invention provides a method for forwarding a packet in a home agent in a mobile Internet Protocol version 6 (IPv6) network system. The method includes the steps of: checking whether a source address of a packet received by the home agent is included in a home address table in a state where forwarding direction information included in the packet received by the home agent differs from set forwarding direction information; and when the source address of the packet received by the home agent is included in the home address table, encapsulating and forwarding the packet received by the home agent using a binding cache entry mapped to a binding cache entry index that corresponds to the source address included in the home address table.

When the source address of the packet received by the home agent is not included in the home address table in a state where the forwarding direction information included in the packet received by the home agent differs from the set forwarding direction information, the method may look up the next hop entry in the next-hop entry table using the address information included in the packet and forward the packet using the looked-up next hop entry.

When the forwarding direction information included in the packet received by the home agent is the same as the set forwarding direction information, the method may remove a tunnel header from a packet having the same forwarding information as the set forwarding direction information and forwarding the resultant packet.

When a home address included in a binding update message received from any mobile node is not included in the home address table, the method may assign a binding cache entry index corresponding to the home address, store the home address and the assigned binding cache entry index in the home address table, store the assigned binding cache entry index in the binding cache entry table, look up a next hop entry corresponding to a care-of address of the mobile node in a next-hop entry table, and store the looked up next hop entry in the binding cache entry corresponding to the assigned binding cache entry index.

When the home address included in the binding update message received from any mobile node is included in the home address table, the method may control update of a binding cache entry mapped to a binding cache entry index that corresponds to the home address included in the home address table, based upon a life time of the binding cache entry.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a flowchart illustrating a method for updating binding in a home agent according to the principles of the present invention; and FIG. 4 is a flowchart illustrating a method for forwarding a packet in a home agent according to the principles of the present invention.

DETAILED DESCRIPTION OF THE INVENTION

Figure 1A:
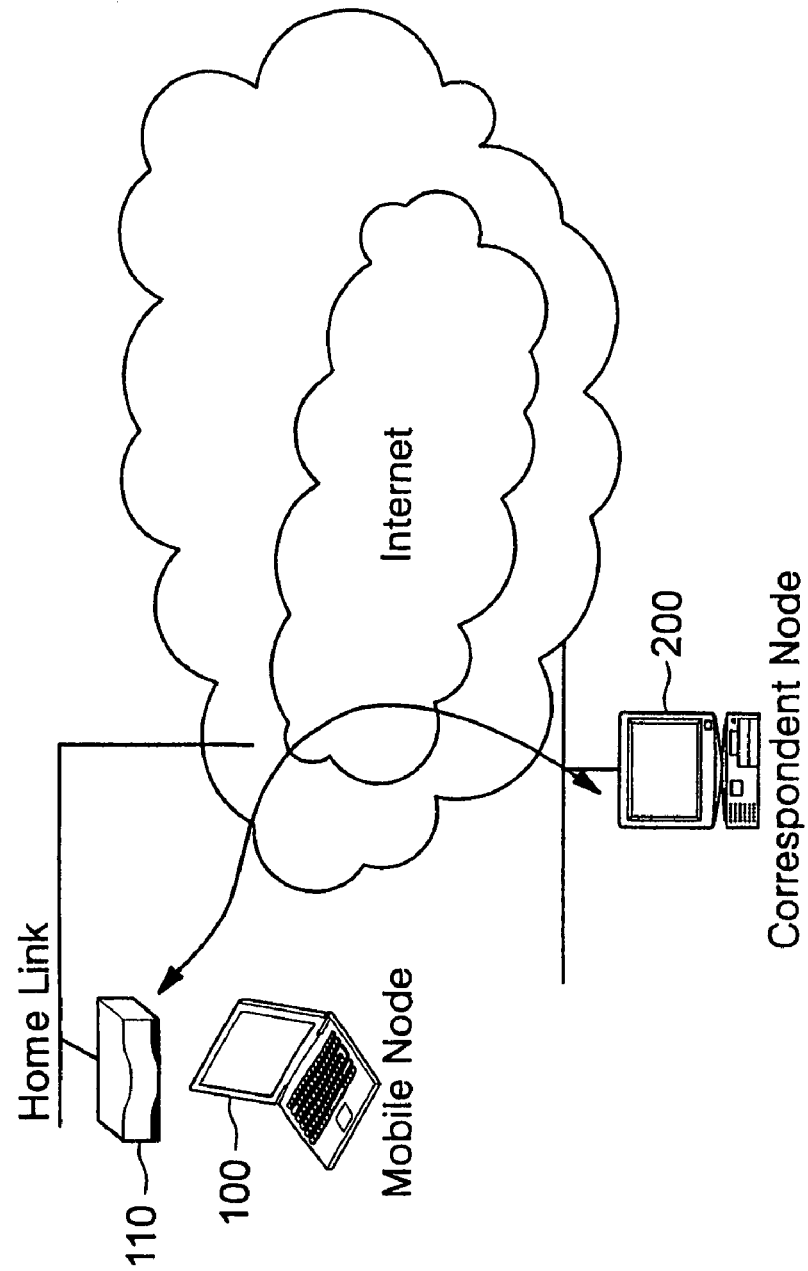
FIG. 1a illustrates a connection over the Internet between a mobile node located on a home link and a correspondent node.
Figure 1B:
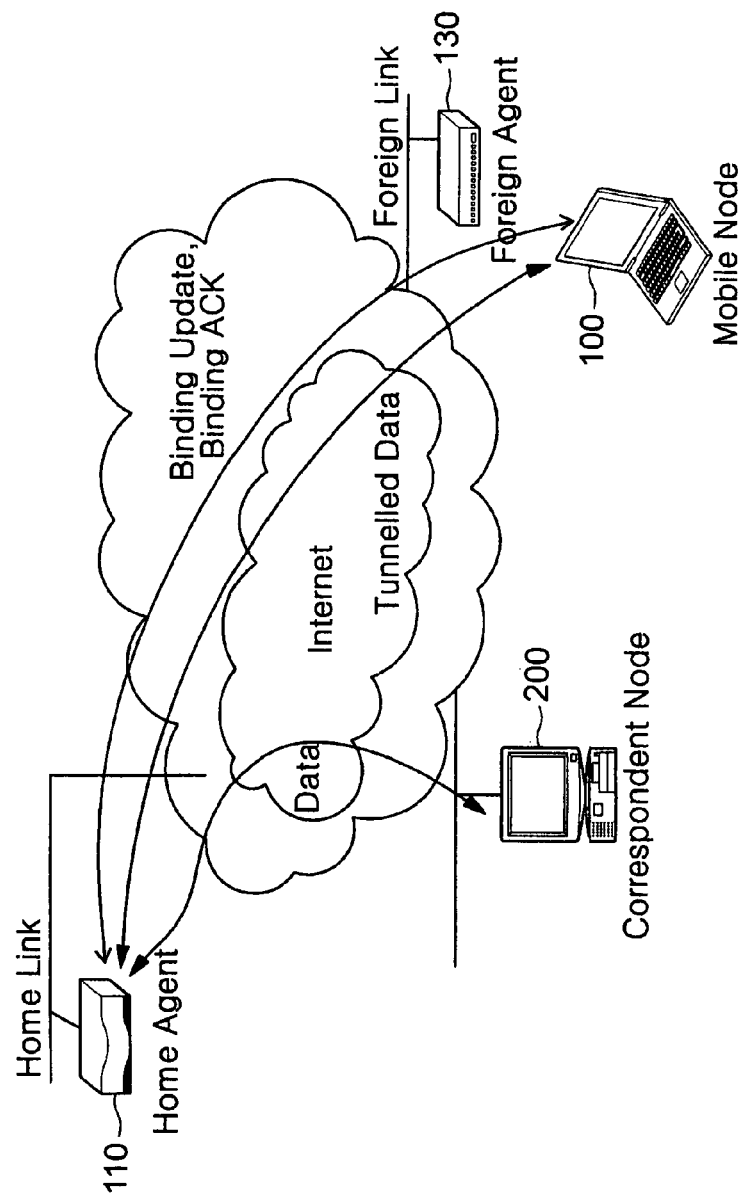
FIG. 1b illustrates a packet flow between a mobile node moving from a home link to another position and a correspondent node.
Figure 1C:
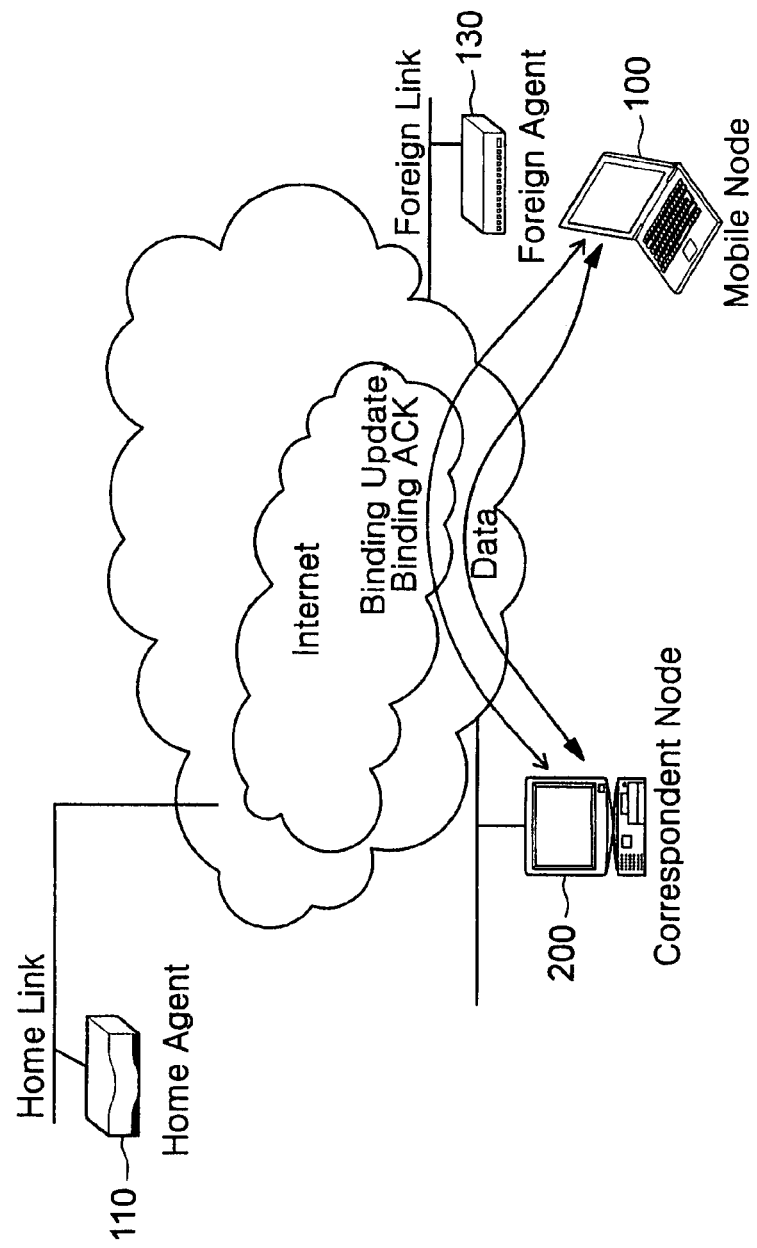
FIG. 1c is a flow diagram illustrating a method for direct communication through path optimization when a mobile node moves from a home link to another position.

FIGS. 1a, 1b, and 1c illustrate packet forwarding flows between a mobile node and a correspondent node in a mobile network.

FIG. 1a illustrates a connection over the Internet between a mobile node located on a home link and a correspondent node.

Mobile node 100, when located on the home link, operates as a general Internet Protocol version 6 (IPv6) node. Mobile node 100 transmits a packet to correspondent node 200 by using a general IP routing method in which a home address is used. Mobile node 100 can move from one link to another link, and continues to connect with other nodes using the home address.

Correspondent node 200 may be any node communicating with mobile node 100. Correspondent node 200 may be a mobile node or a stationary node. Here, the home address is a permanent address assigned to mobile node 100 on the home link. Correspondent node 200 communicates with mobile node 100 using the home address of mobile node 100.

A home agent 110 is a router located on the home link for registering a current position of mobile node 100 which has moved to a foreign link.

FIG. 1b illustrates a packet flow between a mobile node moving from a home link to another position and a correspondent node.

Mobile Internet Protocol version 6 (IPv6) is a protocol applied when a mobile node 100 moves to a foreign link, as shown in FIG. 1b. The foreign link may be any link other than the home link on which mobile node 100 stays. After moving to the foreign link, mobile node 100 is allocated a prefix by a router (e.g., foreign agent 130) on the foreign link and obtains a care-of address. Mobile node 100 transmits a binding update message including the care-of address information to home agent 110. Here, the binding is a piece of information for connecting the home address of the mobile node with the care-of address for a life time. Using the binding information, correspondent node 200 can continue to communicate with mobile node 100 using the home address even when mobile node 100 has moved.

Mobile node 100 needs to update the binding when mobile node 100 obtains a new care-of address or desires to maintain the binding information beyond the life time.

Upon receipt of the binding update message from mobile node 100, home agent 110 transmits a binding response message to mobile node 100. Thus, the binding is established.

Home agent 110 then tunnels a packet transmitted from correspondent node 200 to the home address of mobile node 100 using the care-of address of mobile node 100 in order to transmit the packet to a current position of the mobile node. Meanwhile, home agent 110 decapsulates an IP header from the packet transmitted from mobile node 100 and transmits the resultant packet to correspondent node 200. By doing so, mobile node 100 can continue to communicate with correspondent node 200. Home agent 110 transmits the packet by tunneling the received packet to a current position of the mobile node using the care-of address of mobile node 100. When mobile node 100 moves to the foreign link, mobile node 100 uses a temporary address, i.e., a care-of address, assigned at a position to which mobile node 100 has moved, to provide the current position to home agent 110.

FIG. 1c is a flow diagram illustrating a method for direct communication through path optimization when a mobile node moves from a home link to another position.

In addition to the communication method as shown in FIG. 1b, the mobile Internet Protocol version 6 (IPv6) may allow for direct communication with a correspondent node by supporting path optimization.

As shown in FIG. 1c, when a mobile node 100 receives a packet from a correspondent node 200 through tunneling, mobile node 100 transmits a binding update message having an address of correspondent node 200 as a destination.

Upon receipt of the binding update message from mobile node 100, correspondent node 200 transmits a binding response message. Thus, the binding is established between mobile node 100 and correspondent node 200. This allows mobile node 100 and correspondent node 200 to directly communicate with each other, not via a home agent.

In home agent 110, a network processor ("packet processor") forwards a packet transmitted and received between mobile node 100 and correspondent node 200.

The packet processor in home agent 110 checks a destination address and a next header included in the received packet in order to determine a forwarding direction of the packet. In other words, when a destination address for the received packet is an address of the home agent and information included in the next header is "41", the packet processor determines that the packet received from the mobile node is a tunneling packet to be transmitted to the correspondent node.

The packet processor removes a tunnel header from the tunneling packet received from the mobile node and uses routing information (e.g., a source address) included in the packet without the tunnel header to look up output port (Outport) information and next hop information in a next-hop entry table. The packet processor forwards the packet without the tunnel header to the correspondent node, based upon the output port information and the next hop information looked up in the next-hop entry table.

On the other hand, when the destination address included in the received packet is not the home agent address or the information included in the next header is not "41", the packet processor looks up to see whether the destination address included in the received packet is included in a binding cache entry table.

When the source address included in the received packet exists in the binding cache entry table, the packet processor encapsulates the received packet using a binding cache entry corresponding to the destination address of the binding cache entry table. In this case, the binding cache entry includes a destination address corresponding to the source address and a life time. Preferably, the source address is a home agent address, and the destination address is a care-of address of the mobile node.

After encapsulating the received packet using the binding cache entry information, the packet processor looks up the output port (Outport) information and next hop information in the next-hop entry table using routing information (e.g., the source address) included in the received packet. The packet processor forwards the encapsulated packet to the mobile node, based upon the output port information and the next hop information looked up in the next-hop entry table.

Meanwhile, when the destination address included in the received packet does not exist in the binding cache entry table, the packet processor looks up the output port (Outport) information and the next hop information in the next-hop entry table using the routing information (e.g., the source address) included in the received packet. The packet processor forwards the received packet to a receiving side, based upon the output port information and the next hop information looked up in the next-hop entry table. Thus, the packet in this case is not a packet transmitted and received between the mobile node and the correspondent node.

As described above, the packet processor looks up the binding cache entry table even when a packet is transmitted from the correspondent node to the mobile node and when a packet is not transmitted between the correspondent node and the mobile node.

This causes packet forwarding delay from the correspondent node to the mobile node.

A mobile Internet Protocol version 6 (IPv6) network system and a method for forwarding a packet in the system according to the present invention will be described in detail with reference to the accompanying drawings.

For ease of understanding the present invention, like numbers refer to like elements throughout the specification.

Hereinafter, a packet received at a home agent maybe an Internet Protocol version 6 (IPv6) packet transmitted and received between a mobile node and a correspondent node or between the correspondent node and another node.

Figure 2:
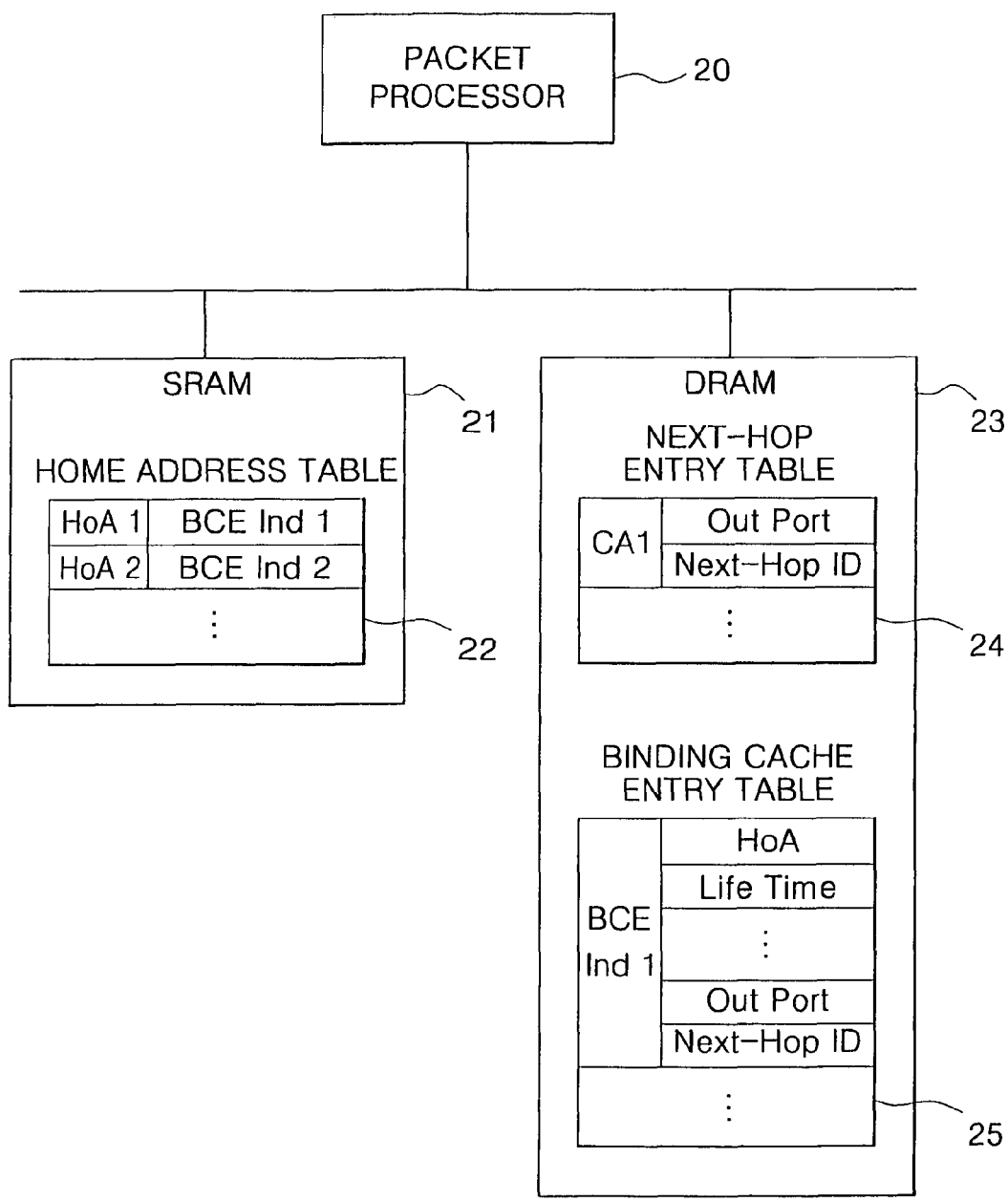
FIG. 2 is a block diagram illustrating a home agent constructed as an embodiment according to the principles of the present invention.

FIG. 2 is a block diagram illustrating a home agent constructed as an embodiment according to the principles of the present invention.

Referring to FIG. 2, the home agent is constructed with a packet processor 20, a static random access memory (SRAM) 21, and a dynamic random access memory (DRAM) 23.

SRAM 21 includes a home address table 22 including home addresses HoA 1, HoA 2, . . . of a plurality of mobile nodes, and binding cache entry indexes BCE Ind 1, BCE Ind 2, . . . corresponding to the home addresses.

DRAM 23 includes a next-hop entry table 24 and a binding cache entry table 25. Next-hop entry table 24 includes care-of addresses CA 1, CA 2, . . . of a plurality of mobile nodes, and next hop entries corresponding to the care-of addresses. A next hop entry is information regarding a next node (i.e., a next hop) to which a packet received by the home agent will be transmitted. Binding cache entry table 25 includes binding cache entries mapped to the binding cache entry indexes (BCE Ind) of home address table 22 for packet transmission and reception between the mobile node and a correspondent node.

Here, binding cache entry table 25 includes a home address (HoA) of the mobile node, a life time of a care-of address of the mobile node, an output port (Outport) of the home agent used for transmitting a packet from the mobile node to the correspondent node, and a next-hop Identifier (ID) indicating an address of a node next to the home agent to which the packet directed to the correspondent node is transmitted from the mobile node.

When a binding update message is received from the mobile node, packet processor 20 determines whether a home address (HoA) included in the binding update message is included in home address table 22.

When the home address included in the binding update message is not included in home address table 22, packet processor 20 assigns a binding cache entry index to correspond to the home address included in the binding update message and registers the home address of the mobile node in home address table 22 in association with the assigned binding cache entry index.

After registering the home address of the mobile node in home address table 22, packet processor 20 looks up a next hop entry corresponding to a care-of address of the mobile node in next-hop entry table 24 and updates the next hop entry in binding cache entry table 25.

In other words, packet processor 20 registers the next hop entry corresponding to the care-of address of the mobile node in the binding cache entry of binding cache entry table 25. Preferably, the binding cache entry in which the next hop entry is included is mapped to the binding cache entry index corresponding to the home address of the mobile node.

Meanwhile, when the home address of the mobile node is included in home address table 22, packet processor 20 checks whether the life time is "0" in the binding cache entry that is mapped to the binding cache entry index corresponding to the home address of the mobile node.

When the life time is "0", packet processor 20 deletes the binding cache entry from binding cache entry table 24 and deletes a home address table entry corresponding to the binding cache entry index of the deleted binding cache entry from home address table 22.

On the other hand, when the life time is not "0", packet processor 20 looks up a next hop entry corresponding to the care-of address of the mobile node in next-hop entry table 24, and updates the looked-up next hop entry in a binding cache entry that corresponds to the binding cache entry index corresponding to the care-of address.

Packet processor 20 then determines a forwarding direction of a packet received from the mobile station, based upon a destination address and a next header included in the received packet. In other words, when the destination address of the received packet is the address of the home agent and the information included in the next header is "41", packet processor 20 determines that the packet received from the mobile node is a tunneling packet to be transmitted to the correspondent node. Accordingly, packet processor 20 removes a tunnel header from the tunneling packet transmitted from the mobile node to the correspondent node, and looks up output port (Outport) information and next hop information in next-hop entry table 24 using routing information (e.g., a source address) included in the packet without the tunnel header. Packet processor 20 forwards the packet without the tunnel header to the correspondent node, based upon the output port information and the next hop information looked up in next-hop entry table 20.

On the other hand, when the destination address included in the received packet is not the home agent address or the information included in the next header is not "41", packet processor 20 looks up to see whether the source address included in the received packet is included in home address table 22.

When the source address included in the received packet exists in home address table 22, packet processor 20 looks up binding cache entry table 25 using the binding cache entry index corresponding to the source address in home address table 22.

Packet processor 20 encapsulates the received packet with the binding cache entry corresponding to the binding cache entry index. In this case, the binding cache entry includes a source address corresponding to a destination address, the destination address, a life time, output port (Outport) information, and next hop information. Preferably, the source address is a home agent address, and the destination address is a care-of address of the mobile node.

After encapsulating the received packet with the binding cache entry information, packet processor 20 forwards the encapsulated packet to the mobile node based upon the output port (Outport) information and the next hop information.

Meanwhile, when the source address included in the received packet does not exist in home address table 22, packet processor 20 looks up the output port (Outport) information and the next hop information in next-hop entry table 24 using the routing information (e.g., the source address) included in the received packet. Packet processor 20 forwards the received packet to a receiving side based upon the output port information and the next hop information looked up in next-hop entry table 24. Thus, the packet in this case is not a packet transmitted and received between the mobile node and the correspondent node.

FIG. 3 is a flowchart illustrating a method for updating binding in a home agent according to the present invention.

As shown in FIG. 3, when a binding update message is received from the mobile node (S30), the home agent determines whether a home address (HoA) included in the binding update message is included in the home address table (S31).

When the home address included in the binding update message is not included in the home address table, the home agent assigns a binding cache entry index corresponding to the home address and registers the home address of the mobile node in the home address table (S32).

After registering the home address of the mobile node in the home address table, the home agent looks up a next hop entry corresponding to a care-of address of the mobile node in the next-hop entry table (S33) and updates the next hop entry corresponding to the care-of address of the mobile node in the binding cache entry table (S34).

In other words, the home agent registers the next hop entry corresponding to the care-of address of the mobile node in the binding cache entry of the binding cache entry table. Preferably, the binding cache entry in which the next hop entry is included is mapped to the binding cache entry index corresponding to the home address.

Meanwhile, when it is determined in step S31 that the home address of the mobile node is included in the home address table, the home agent checks whether the life time is "0" in the binding cache entry that is mapped to the binding cache entry index corresponding to the home address of the mobile node (S35).

When the life time is "0", the home agent deletes the binding cache entry from the binding cache entry table (S38) and deletes a home address table entry corresponding to the binding cache entry index of the deleted binding cache entry (S39) from the home address table.

On the other hand, when the life time is not "0", the home agent looks up a next hop entry corresponding to the care-of address of the mobile node in the next-hop entry table (S36), and updates the looked-up next hop entry in a binding cache entry that corresponds to the binding cache entry index corresponding to the care-of address (S37).

FIG. 4 is a flowchart illustrating a method for forwarding a packet in a home agent according to the present invention.

As shown in FIG. 4, when a packet is received (S40), the home agent checks whether a destination address included in the received packet is a home agent address and a next header is set to "41" (S41).

When the destination address of the received packet is the address of the home agent and the information included in the next header is "41", the home agent determines that the packet received from the mobile node is a tunneling packet to be transmitted to the correspondent node, and removes a tunnel header from the tunneling packet, which is transmitted from the mobile node to the correspondent node (S42).

The home agent looks up the output port (Outport) information and the next hop information in the next-hop entry table using the routing information (e.g., a source address) included in the packet without the tunnel header, and forwards the packet without the tunnel header to the correspondent node, based upon the output port information and the next hop information looked up in the next-hop entry table (S45).

On the other hand, when the destination address included in the received packet is not the home agent address or the information included in the next header is not "41", the home agent looks up to see whether the source address included in the received packet is included in the home address table (S43).

When the source address included in the received packet exists in the home address table, the home agent looks up the binding cache entry index corresponding to the source address in the home address table, and then looks up the binding cache entry corresponding to the binding cache entry index in the binding cache entry table.

The home agent encapsulates the received packet with the binding cache entry corresponding to the binding cache entry index (S46). In this case, the binding cache entry includes a source address corresponding to a destination address, the destination address, a life time, output port (Outport) information, and next hop information. Preferably, the source address is a home agent address, and the destination address is a care-of address of the mobile node.

After encapsulating the received packet with the binding cache entry information, the home agent forwards the -encapsulated packet to the mobile node based upon the output port (Outport) information and the next hop information (S47).

Meanwhile, when the source address included in the received packet does not exist in the home address table, the home agent looks up the output port (Outport) information and the next hop information in the next-hop entry table using the routing information (e.g., the source address) included in the received packet. The home agent forwards the received packet to a receiving side based upon the output port information and the next hop information looked up in the next-hop entry table (S45). Thus, the packet in this case is not a packet transmitted and received between the mobile node and the correspondent node.

As described above, the mobile Internet Protocol version 6 (IPv6) network system and the method for forwarding a packet in the system can prevent packet forwarding delay caused by looking up the binding cache entry for all received packets to determine whether each packet is an Internet Protocol version 6 (IPv6) packet transmitted and received between the mobile node and the correspondent node.

While the present invention has been described with reference to exemplary embodiments thereof, it will be understood by those skilled in the art that various changes in form and detail may be made therein without departing from the scope of the present invention as defined by the following claims.

What is claimed is:

1. A home agent in a mobile Internet Protocol version 6 (IPv6) network system, comprising:
   a home address table comprising home addresses of a plurality of mobile nodes and binding cache entry indexes corresponding to the home addresses;
   a next-hop entry table comprising a plurality of next hop entries mapped to care-of addresses of the mobile nodes, each next hop entry comprising an address of a next node to which a packet received from the mobile node is to be transmitted, and port information of a home agent by which the packet received from the mobile node is forwarded to the next node;
   a binding cache entry table comprising a plurality of binding cache entries mapped to the binding cache entry indexes, each binding cache entry comprising a home address of the mobile node, a life time of a care-of address of the mobile node, an output port of the home agent used for transmitting the packet from the mobile node to a correspondent node, and an address of a node next to the home agent to which the packet directed to the correspondent node is transmitted from the mobile node; and
   a packet processor for, when a source address of a packet received by the home agent is included in the home address table in a state where forwarding direction information included in the packet received by the home agent differs from a set forwarding direction information, encapsulating and forwarding the packet received by the home agent using a binding cache entry that is mapped to a binding cache entry index corresponding to the source address included in the home address table.

2. The home agent according to claim 1, comprised of, when the source address of a packet received by the home agent is not included in the home address table in a state where the forwarding direction information included in the packet received by the home agent differs from the set forwarding direction information, the packet processor looking up a next hop entry in the next-hop entry table using the address information included in the packet, and forwarding the packet using the looked-up next hop entry.

3. The home agent according to claim 1, comprised of, when the forwarding direction information included in the packet received by the home agent is the same as the set forwarding direction information, the packet processor removing a tunnel header from a packet having the same forwarding information as the set forwarding direction information and forwarding the resultant packet.

4. The home agent according to claim 1, comprised of, when a home address included in a binding update message received from a mobile node is not included in the home address table, the packet processor assigning a binding cache entry index corresponding to the home address, storing the home address and the assigned binding cache entry index in the home address table, storing the assigned binding cache entry index in the binding cache entry table, looking up a next hop entry corresponding to a care-of address of the mobile node in the next-hop entry table, and storing the looked-up next hop entry corresponding to the care-of address of the mobile node in the binding cache entry table.

5. The home agent according to claim 4, comprised of, when the home address included in the binding update message received from a mobile node is included in the home address table, the packet processor controlling an update of a binding cache entry mapped to a binding cache entry index that corresponds to the home address included in the home address table, based upon a life time of the binding cache entry.

6. The home agent according to claim 5, comprised of, when the life time of the binding cache entry equals to "0", the packet processor deleting the binding cache entry mapped to the binding cache entry index from the binding cache entry table, and deleting a home address table entry corresponding to the binding cache entry index of the deleted binding cache entry from the home address table.

7. The home agent according to claim 5, comprised of, when the life time of the binding cache entry does not equal to "0", the packet processor looking up a next hop entry corresponding to a care-of address of the mobile node in the next-hop entry table, and storing the looked-up next hop entry corresponding to the care-of address of the mobile node in the binding cache entry table.

8. A method for forwarding a packet in a home agent in a mobile Internet Protocol version 6 (Ipv6) network system, the method comprising the steps of:
   checking whether a source address of a packet received by the home agent is included in a home address table in a state where forwarding direction information included in the packet received by the home agent differs from a set forwarding direction information;
   when the source address of the packet received by the home agent is included in the home address table, encapsulating the packet received by the home agent using a binding cache entry mapped to a binding cache entry index that corresponds to the source address included in the home address table, and forwarding the encapsulated packet;
   when a home address included in a binding update message received from a mobile node is not included in the home address table, assigning a binding cache entry index corresponding to the home address and storing the home address and the assigned binding cache entry index in the home address table; and
   storing the assigned binding cache entry index in the binding cache entry table, looking up a next hop entry corresponding to a care-of address of the mobile node in a next-hop entry table, and storing the looked-up next hop entry corresponding to the care-of address of the mobile node in the binding cache entry table.

9. The method according to claim 8, further comprising the step of, when the source address of the packet received by the home agent is not included in the home address table in a state where the forwarding direction information included in the packet received by the home agent differs from the set forwarding direction information, looking up the next-hop entry table using the address information included in the packet and forwarding the packet using the looked-up next hop entry.

10. The method according to claim 8, further comprising the step of, when the forwarding direction information included in the packet received by the home agent is the same as the set forwarding direction information, removing a tunnel header from a packet having the same forwarding information as the set forwarding direction information and forwarding the resultant packet.

11. The method according to claim 8, further comprising the step of, when the home address included in the binding update message received from any mobile node is included in the home address table, controlling an update of a binding cache entry mapped to a binding cache entry index that corresponds to the home address included in the home address table based upon a life time of the binding cache entry.

12. The method according to claim 8, further comprising the step of, when the life time of the binding cache entry equals to "0", deleting the binding cache entry mapped to the binding cache entry index from the binding cache entry table, and deleting a home address table entry corresponding to the binding cache entry index of the deleted binding cache entry from the home address table.

13. The method according to claim 8, further comprising the step of, when the life time of the binding cache entry does not equal to "0", looking up a next hop entry corresponding to a care-of address of the mobile node in the next-hop entry table, and storing the looked-up next hop entry corresponding to the care-of address of the mobile node in the binding cache entry table.

* * * * *